United States Patent
Kovanen et al.

[11] Patent Number: 5,448,765
[45] Date of Patent: Sep. 5, 1995

[54] RADIO TELEPHONE HAVING REMOVABLE MEMORY CONTAINING ALL ESSENTIAL SOFTWARE, INCLUDING CONTROL PARAMETERS

[75] Inventors: Jari Kovanen, Palokka; Iaavi Yli-Kotila, Äänekoski, both of Finland

[73] Assignee: Nokia Telecommunications OY, Espoo, Finland

[21] Appl. No.: 137,126

[22] PCT Filed: Feb. 24, 1993

[86] PCT No.: PCT/FI93/00064

§ 371 Date: Oct. 20, 1993

§ 102(e) Date: Oct. 20, 1993

[87] PCT Pub. No.: WO93/17512

PCT Pub. Date: Sep. 2, 1993

[30] Foreign Application Priority Data

Feb. 28, 1992 [FI] Finland ................. 920913

[51] Int. Cl.⁶ ................ H04B 1/40; H04Q 7/32
[52] U.S. Cl. ................. 455/90; 455/89; 455/186.1; 379/58; 379/357
[58] Field of Search ........... 455/89, 90, 186.1, 186.2, 455/185.1; 379/58, 59, 142, 357, 429

[56] References Cited

U.S. PATENT DOCUMENTS 4,887,311 12/1989 Garner et al. ............... 455/76
5,153,906 10/1992 Akiyama ................ 379/142

FOREIGN PATENT DOCUMENTS 301740 2/1989 European Pat. Off. .
369110 5/1990 European Pat. Off. .
3721360 1/1989 Germany .
3838677 5/1990 Germany ............... 455/89

OTHER PUBLICATIONS

WO-A1,9112698 (22 Aug. 1991) p. 7, Line 28—p. 8, Line 7.

Primary Examiner—Edward F. Urban
Assistant Examiner—Chi H. Pham
Attorney, Agent, or Firm—Cushman Darby & Cushman

[57] ABSTRACT

A radio telephone or the like, comprising including a radio transceiver, a microprocessor circuitry, a work memory, and a reading device in which a removable memory can be inserted to enable reading under control of the microprocessor circuitry, the memory containing the individual data of a radio subscriber and at least the system-specific control parameters of at least one radio telephone system. The microprocessor circuitry configures the radio telephone to operate in the radio telephone system by means of the parameters. The removable memory contains essentially the entire software of the radio telephone including the control parameters, and the non-volatile program memory of the radio telephone contains only the loading routine for loading the software including the control parameters into the work memory when the radio telephone is switched on or the removable memory is inserted in the reading device.

4 Claims, 1 Drawing Sheet

RADIO TELEPHONE HAVING REMOVABLE MEMORY CONTAINING ALL ESSENTIAL SOFTWARE, INCLUDING CONTROL PARAMETERS

FIELD OF THE INVENTION

The invention relates to a radio telephone or the like, comprising a radio transceiver, a microprocessor circuitry, a work memory, and a reading device in which a removable memory can be inserted to enable reading under control of the microprocessor circuitry, the removable memory containing the individual data of a radio subscriber and at least the system-specific control parameters of at least one radio telephone system, the microprocessor circuitry configuring a radio telephone to operate in the radio telephone system in question by means of the parameters.

BACKGROUND OF THE INVENTION

So-called private automatic radio telephone networks or trunked networks, where several user groups or even several user organisations share the same radio channels and other resources in a common network are widely used. Typical private radio network applications include energy production and distribution, communal and municipal services, such as transportation, construction and maintenance, and emergency services, such as police, fire alarm, security and ambulance. A private radio network may offer fast access within the user's own organisation, individual or group communication, data communication, etc. The system checks the subscriber authorization and allocates resources. An individual subscriber is unaware that he or she uses the same frequencies as other subscribers since the system automatically allocates a free radio channel for a call during the call set-up. Radio telephone systems of this kind usually have a rather limited geographical coverage, and so the user may easily get outside the service area of his or her own system, whereby he or she cannot use his radio telephone. Therefore, interest has been aroused in the possibility of using the same radio telephone in several different systems.

The specifications MPT 1327 and MPT 1343 issued by the British Department of Trade and Industry have become to be regarded as some kind of de facto standards in Europe for private radio telephone networks. MPT 1327 specifies signalling over the radio path, while MPT 1343 specifies the operation and structure of the radio telephone. Systems complying with these specifications have been and will be introduced in different European countries. Since radio telephones used in different systems actually comply with the same specification MPT 1343, they can, in principle, be transferred from one radio telephone network to another by varying the network-specific radio telephone parameters complying with the MPT 1343. The network parameters that are needed and can be stored in a radio telephone are defined on pages 6-1 to 6-8 of Part 6 of MPT 1343, particularly in Table 6-1.

According to the above Part of the specification, radio sections providing the user with a possibility of switching between the systems selected must have a sufficient parameter storage to meet the requirements of every system. According to the above specification, the majority of the network parameters must be stored in a memory of type A, i.e. read-only memory. The parameters varying during the operation of the radio section must be stored in a memory of type B or C, i.e. secured or unsecured memory, respectively, depending on whether the information may disappear when the radio telephone is turned off.

German Offenlegungsschrift 3,838,677 discloses a radio telephone in which the loss of important data caused by the user is prevented during the operation of the radio telephone by storing the data in a removable memory card, in which are also stored the identification data of the radio subscriber. These important data include, e.g., the last call and the mode of operation of the phone. The subscriber data can be transferred from one radio telephone of a system to another similar phone in the same system by means of a memory card, automatic control of individual subscriber data stored in the memory card preventing the use of the memory in a similar phone in another system.

German Offenlegungsschrift 3,721,360 discloses a radio device in which network-specific control values are stored in a removable memory to enable further development of the network and associated updating of the subscriber devices.

SUMMARY OF THE INVENTION

The object of the invention is to provide a radio telephone or the like that can be modified for use in different radio telephone systems in a simple manner, updated with new functions or tailored in accordance with the special requirements of the user or system.

This is achieved with a radio telephone of the type described in the introduction, the radio telephone according to the invention being characterised in that the removable memory contains essentially the entire software of the radio telephone including the control parameters, and that the non-volatile program memory of the radio telephone contains only the loading routine for loading the software including the control parameters into the work memory when the radio telephone is switched on or the removable memory is inserted in the reading device.

In using the invention, the user configures the radio telephone on a system-specific basis, i.e., he or she sets the control parameters by loading at least the system-specific parameters but advantageously all the parameters that are essential to the operation of the radio telephone from a separate removable memory, such as a memory card (so-called smart card) or a memory module. The removable memory also contains, e.g., the identification data of the radio telephone subscriber. The invention enables the user to change radio systems in an easy, fast and reliable manner. It also facilitates the use of an existing radio telephone in other radio telephone systems possibly established later on.

The removable memory also contains essentially the entire software of the radio telephone including the control parameters. The built-in program memory of the radio telephone only contains the loading routine, which loads the software including the control parameters into the work memory when the radio telephone is switched on or the removable memory is inserted in the reading device. This solution enables easy updating of the software of a radio telephone.

In one embodiment of the invention, the user may have a separate removable memory for each system, and so a single radio telephone is configured to operate in the radio telephone system that corresponds to the removable memory that is currently connected thereto.

The user may switch from one radio telephone system to another simply by changing removable memories.

In another embodiment of the invention, a single removable memory may contain parameters of several radio telephone systems, whereby the user may load the parameters of the system desired via a user interface of a radio telephone.

BRIEF DESCRIPTION OF THE DRAWINGS

In the following, the invention will be described by means of embodiments with reference to the attached drawing, wherein.

DETAILED DESCRIPTION OF THE INVENTION

Figure 1:
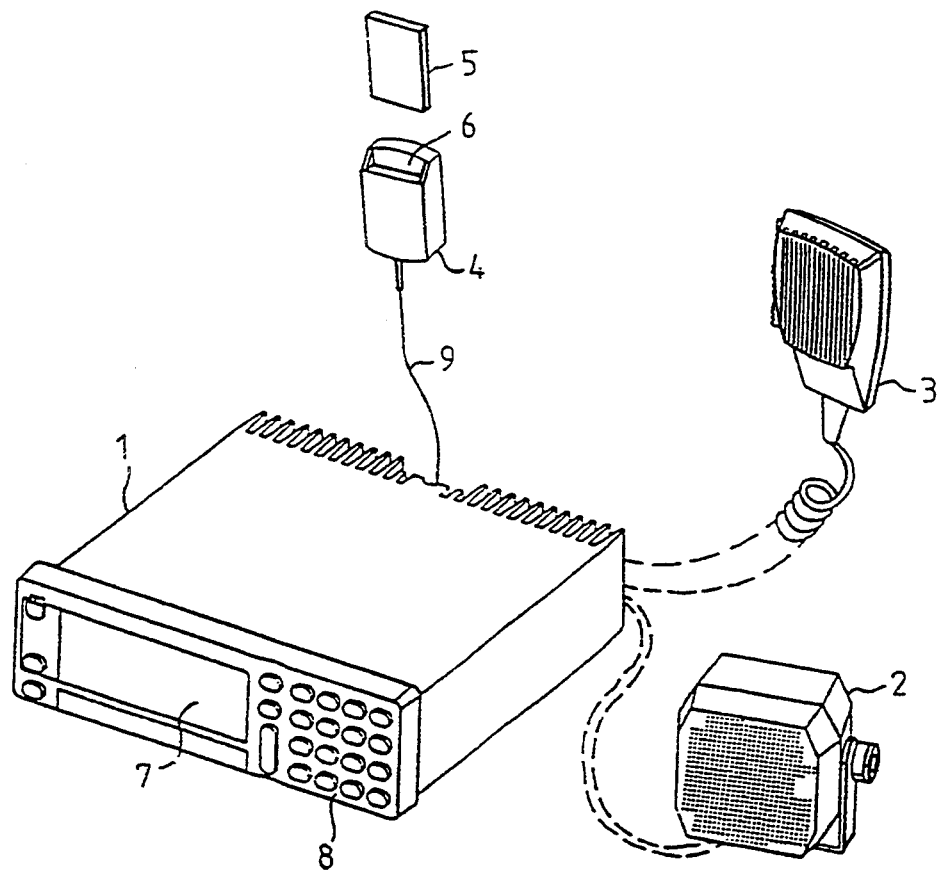
FIG. 1 shows a perspective view of a radio telephone device according to the invention.
Figure 2:
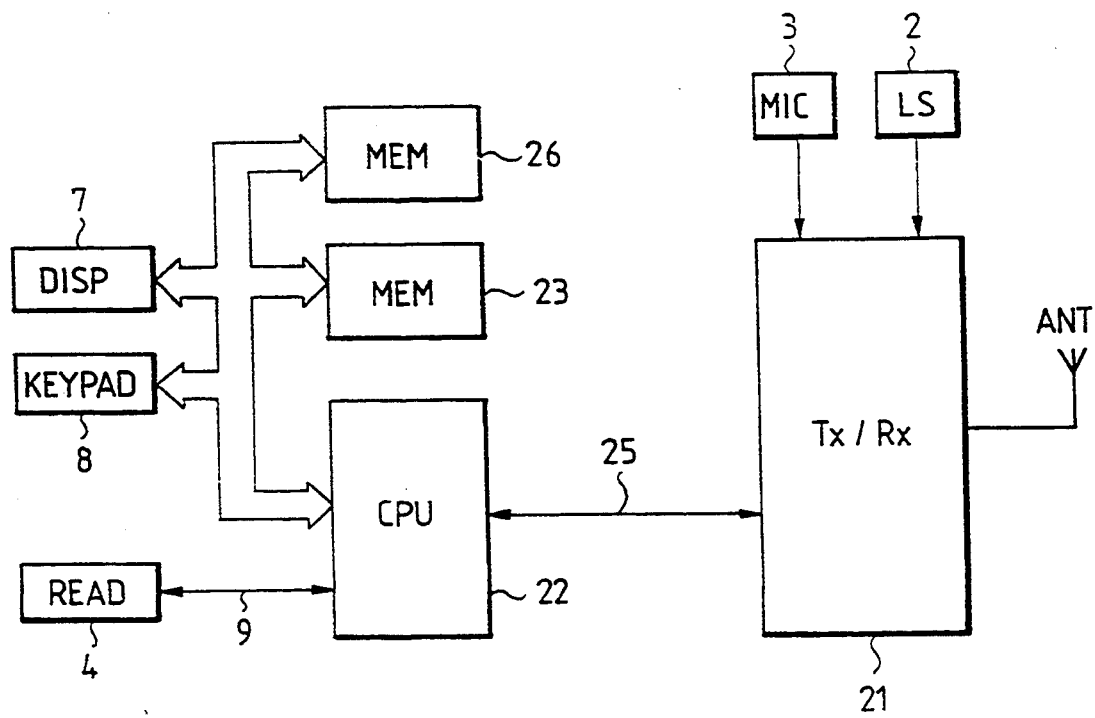
FIG. 2 shows a schematic block diagram of the radio telephone device of FIG. 1.

The invention may be applied to almost any kind of conventional radio telephone device, e.g. a portable mobile phone or a vehicle station to which is added the ability of using a removable memory. FIG. 1 shows, by way of an example, a radio telephone device of the invention which can be mounted e.g., in a vehicle, the device comprising a transceiver section 1 having a user interface formed by a display 7 and a keypad 8. To the radio telephone device may also be connected e.g., a separate microphone 3 and a separate loudspeaker 2. Further, a line 9 connects a separate reading device 4 for a memory card or module to the device, the reading device having an input slot 6, through which a removable memory 5, such as a memory card or module 5, can be inserted in the reading device 4 in such a way that it can later be easily removed or detached. An example for a portable mobile phone to which the invention can be applied is the portable mobile phone of German Offenlegungsschrift 3,838,677, that mobile phone including a reading device for a memory card.

FIG. 1 shows a schematic block diagram of the radio telephone according to FIG. 1, in which a block 21 represents, in general, baseband and radio sections of a radio telephone, such as a transceiver, a synthesizer, signalling circuits, interface circuits and baseband signal processing circuits. A separate microphone 3, a separate loudspeaker 2 and a separate antenna ANT may be connected to the block 21.

Block 22 represents, in general, a microprocessor circuitry controlling the baseband and radio sections, a bus 24 or the like interconnecting the block with a read-write memory 23 used as a work memory, a non-volatile read-only memory 26 used as a program memory, and a display 7 and a keypad 8 forming a user interface. All data, control, signalling, etc., connections between the radio and baseband sections 21 and the microprocessor circuitry 22 are represented generally by the number 25.

According to the invention, a reading device 4 is connected to the microprocessor circuitry 22 by the line 9, the microprocessor circuitry 22 being capable of reading the contents of the removable memory 5 inserted in the reading device by means of the reading device. The type of the reading device is generally determined by the removable memory used. In the simplest form, the reading device 4 may here be a connector device, which provides an electric connection to the memory circuits in the memory card or module 5.

The removable memory 5 may be practically any removable memory suited for the purpose. In a preferred embodiment of the invention, an 8 Kbyte SRAM module BS8E1, a 16 Kbyte SRAM module BS16D1-B or a 64 Kbyte SRAM module CSC-064K-SM-04-M56 is used, depending on the storage capacity needed, all of these modules being manufactured by Fujisoku. A suitable reading device 4 is of the type CR40 and manufactured by Telenokia.

In a preferred embodiment of the invention, essentially all the radio telephone system-specific control parameters are stored in the removable memory 5, i.e. the parameters that may vary from one radio telephone system to another. The other parameters and the software are stored in the program memory 26. The program memory may, if desired, contain the network-specific data of one radio telephone system, the data being used as default parameters. The microprocessor circuitry 22 may load the parameters from the memory 5 to the work memory 23 either immediately after the memory 5 has been inserted into the reading device 4 or after the command has been given via the user interface. Every removable memory 5 may contain the parameters of one system, whereby the changing of a memory 5 to another changes the system. Alternatively, the memory 5 may contain parameters of several systems, the user selecting the parameters desired by a command given via the user interface.

The network-specific parameters may be e.g., the parameters provided with the abbreviation NP in Table 6-1 on pages 6-1 to 6-8 in Part 6 of the specification MPT 1343 issued by the British Department of Trade and Industry, the parameters including, e.g., a page identifier of the subscriber, group call numbers, time-monitoring of different call types, messages and operations, the lowest and highest channel (frequency) used in the system, normal hunt channels, a system identifier and handover criteria for the call channel. The network-specific parameters may also include the channel spacing used in the system and, e.g., the control value of the zero channel for the synthesizer of a transceiver particularly in a radio telephone to which the synthesizer control principle as set forth in Finnish Patent Application 920,645 is applied.

In the invention, the entire software of the radio telephone is also stored in the removable memory 5. The program memory 26 contains only the loading routine for loading the actual operating system from the memory 5 to the memory 23. This solution enables the use of the same radio telephone in networks operating in very different ways. In addition, updating of software in existing radio telephones, e.g., when functions are changed or added to the system is very easy.

The attached drawing and the description thereof are to be understood only as illustrating the invention. The details of the radio device according to the invention may vary within the scope of the attached claims.

We claim:

1. A radio telephone, comprising a radio transceiver, a microprocessor circuitry, a work memory, a non-volatile program memory and a reading device in which a removable memory is inserted to enable reading under control of the microprocessor circuitry, the removable memory containing individual data of a radio subscriber and at least system-specific control parameters of at least one radio telephone system, the microprocessor circuitry configuring the radio telephone to operate in said at least one radio telephone system by means of said parameters wherein said removable memory contains essentially the entire software of the radio telephone including the system-specific control parameters, and wherein the nonvolatile program memory of the radio telephone contains only a loading routine for loading the software from the removable memory including the system-specific control parameters into the work memory when the radio telephone is switched on or when the removable memory is inserted in the reading device.

2. A radio telephone according to claim 1, wherein said removable memory contains substantially all parameters that are essential to the operation of the radio telephone.

3. A radio telephone according to claim 1, wherein said removable memory is a memory card and that said reading device is a card reading device.

4. A radio telephone according to claim 1, wherein said removable memory contains an electronic memory circuit and that said reading device is a connector device for electrically connecting the memory circuit to the radio telephone.

* * * * *

UNITED STATES PATENT AND TRADEMARK OFFICE
CERTIFICATE OF CORRECTION

PATENT NO.   : 5,448,765

DATED        : September 5, 1995

INVENTOR(S)  : KOVANEN et al.

It is certified that error appears in the above-identified patent and that said Letters Patent is hereby corrected as shown below:

On the title page:

Item [75], change "Iaavi Yli-Kotila" to --Taavi Yli-Kotila--.

Signed and Sealed this

Fourteenth Day of May, 1996

Attest:

BRUCE LEHMAN

*Attesting Officer*    *Commissioner of Patents and Trademarks*